Dec. 12, 1961  A. W. SEYFRIED ET AL  3,013,133
CENTRIFUGAL GOVERNOR FOR ELECTRIC MOTORS
Filed Nov. 27, 1959  2 Sheets-Sheet 1
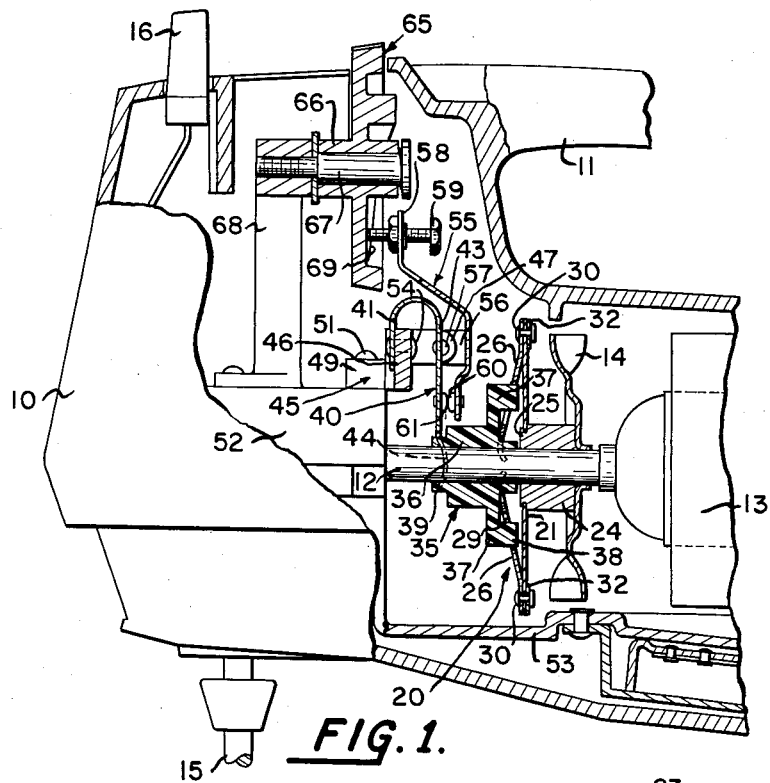
FIG. 1.
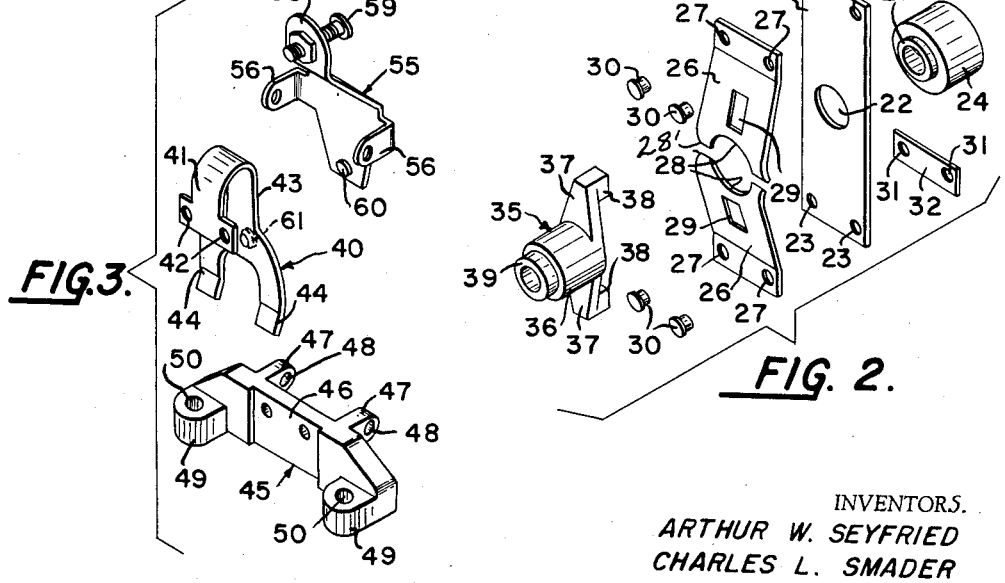
FIG. 3.
FIG. 2.
INVENTORS.
ARTHUR W. SEYFRIED
CHARLES L. SMADER
BY Bertha L. MacGregor
ATTORNEY Dec. 12, 1961 A. W. SEYFRIED ET AL 3,013,133
CENTRIFUGAL GOVERNOR FOR ELECTRIC MOTORS
Filed Nov. 27, 1959 2 Sheets-Sheet 2

INVENTORS.
ARTHUR W. SEYFRIED
CHARLES L. SMADER
BY Bertha L. macGregor
ATTORNEY

United States Patent Office 3,013,133
Patented Dec. 12, 1961

3,013,133
CENTRIFUGAL GOVERNOR FOR ELECTRIC MOTORS
Arthur W. Seyfried and Charles L. Smader, Racine, Wis., assignors to Scovill Manufacturing Company, Waterbury, Conn., a corporation of Connecticut
Filed Nov. 27, 1959, Ser. No. 855,716
9 Claims. (Cl. 200—80)

This invention relates to centrifugal governors for electric motors which may be embodied in power units of food mixers for driving beater shafts and in power units for operating other tools.

The object of the invention is to provide an efficient, dependable governor by which constant motor speeds over a wide range of manually controlled speed settings can be maintained notwithstanding variations in load.

Another object of the invention is to produce a governor which is simple and compact in construction and in which the centrifugally influenced members are in perfect balance. The governor herein shown and described comprises a speed responsive member consisting of a hub, a resilient plate mounted on the hub, and two blades connected to opposite ends of the plate. The blades are made of soft, formable metal, steel or brass, identical in weight and form, and therefore in perfect balance. The blades actuate a slider element on the motor shaft. Under influence of centrifugal force, the blades intermittently cause the slider to bear against a contact carrying spring member which is part of a make and break switch mechanism.

Another novel feature of our invention is the construction of the contact carrying spring member. It is relatively long and therefore smooth and soft in action, but occupies relatively small space in the motor housing due to its special form.

Other objects and advantages of the invention will become apparent from the drawings and following description.

In the drawings:

FIG. 1 is a longitudinal, vertical sectional view, partly elevational, of the forward portion of the power unit of a food mixer embodying our invention.

FIG. 2 is an exploded perspective view of the parts which constitute the speed responsive member of the centrifugal governor.

FIG. 3 is an exploded perspective view of the make and break switch mechanism located between the speed responsive member and a speed control dial.

Figure 4:
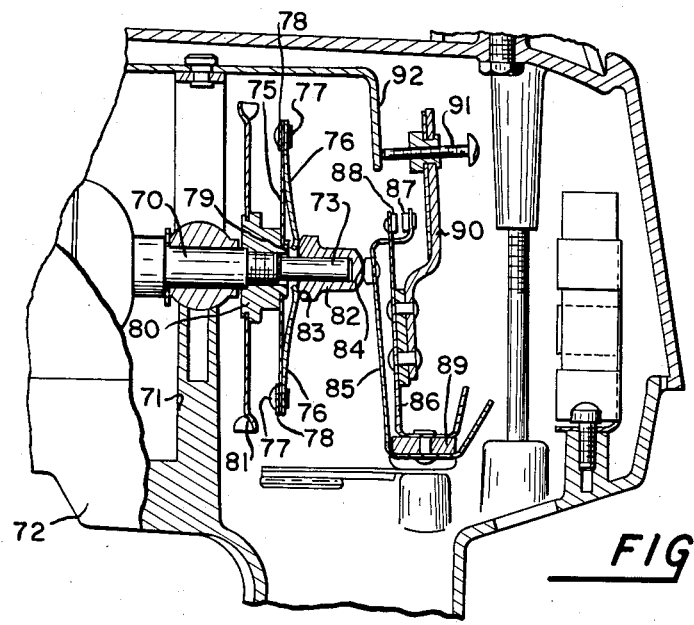
FIG. 4 is a longitudinal, vertical sectional view, partly elevational, of the rearward portion of a power unit of a food mixer, showing a modified embodiment of our invention.

The invention is shown as embodied in the power unit of a food mixer comprising a housing 10, provided with a handle 11, a motor shaft 12 extending horizontally in the housing, a motor 13 and fan 14 on the shaft, beater shafts 15 and beater ejector means 16. The aforementioned parts, as well as gearing between the motor shaft and beater shafts, may be conventional in form and are not shown in detail herein. The centrifugal governor embodying our invention may be adapted to cooperate with various kinds of switch mechanisms, and may be located in different parts of the power units of which it is a part.

The embodiment of our invention shown in FIGS. 1–3, inclusive, comprises a speed responsive member 20 which includes a flat perforated spring steel plate 21 having a central opening 22 and four small rivet apertures 23.

The resilient plate 21 is firmly attached to the hub 24. A reduced portion 25 on the hub passes through the opening 22 of the plate and is formed outwardly and downwardly in a punch press operation to clamp the plate 21 permanently on the hub 24, the latter being fixed on the motor shaft 12 to rotate therewith. The member 20 also includes two identical speed responsive blades 26, each apertured at one end as indicated at 27 and provided at the opposite free end with a centrally curved edge 28 and side members 28'. A slot 29 is located between the ends of each blade 26. Said blades are secured to the plate 21 by rivets 30 which extend through the apertures 23 and 27 and through apertures 31 of backing plates 32. The rivet ends are clinched on the outer side of the backing plates, thus connecting the resilient plate 21 and blades 26, which together with the hub 24, form a speed responsive unit, the backing plates 32 serving also as weights in the unit. The fan 14 may be mounted on the hub 24, as shown, but it does not function as a part of the centrifugal governor and may be mounted directly on the motor shaft.

Figure 5:
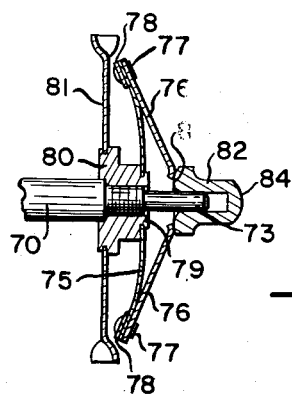
FIG. 5 is a vertical sectional view showing the speed responsive member which is part of the construction of FIG. 4, in the high speed position.

The effect of centrifugal force on the speed responsive unit is to bend the resilient plate 21 near its outer opposite end portions and to move the inner curved end portions 28 and members 28' of the blades 26 away from each other and away from the resilient plate 21. The outer end portions of the blades 26, being firmly connected to the outer ends of the resilient plate 21, are moved with the plate 21 as it bends under influence of centrifugal force, but because the inner proximate ends of the two blades are free to move away from each other and from the plate 21, the blades 26 do not bend with the plate 21. The effect of the centrifugal force on the resilient plate and blades attached thereto is illustrated in FIG. 5 in connection with a modified form of construction, but the action of the resilient plate 21 and blades 26 is the same as that shown in FIG. 5.

A nylon slider 35 comprises a hub 36, opposite radially extending arms 37 integral with the hub, and a projection 38 on the rearward face of each arm. The projections 38 are adapted to enter the slots 29 of the blades 26. The hub is slidable longitudinally on the motor shaft 12. The proximate free end portions 28' of the blades 26 bear against the slider 35 which slides on the shaft 12 in response to movement of the blades. The projections 38 on the arms 37, extending into the slots 29, prevent the blades from moving too far from the resilient plate 21 under abnormal speeds which otherwise might injure the speed responsive unit. Under normal operating conditions, the cooperating projections 38 and slots 29 are not required, and a simple slider without arms 37 and projections 38 may be used.

The forward reduced portion 39 of the slider hub 36 contacts a spring member 40 which is part of the make and break switch mechanism. The spring member 40 includes an upwardly extending body portion 41 provided with apertured laterally projecting ears 42, the portion 41 being integral with a downwardly extending body portion 43 terminating in legs 44 which straddle the reduced end 39 of the slider hub 36. The upwardly and the downwardly extending portions 41, 43 are connected by a curved portion, the reverse direction arrangement being such that the spring body is relatively long, smooth and soft in action, but occupies relatively small space.

The spring member 40 is mounted on a bracket 45 which may be made of plastic material. The bracket consists of a body 46 provided with two apertures near its central portion which register with the apertures in the ears 42 of the member 40 to receive screws which fasten the parts 40 and 45 together. Projecting rearwardly from the body 46 are bosses 47 horizontally apertured in alignment as indicated at 48. At opposite ends the bracket body 46 has bosses 49 with vertical apertures 50 extending therethrough. As shown in FIG. 1, screws 51 extend downwardly through the apertures 50 of the bosses 49 to mount the bracket 45 on a fixed part 52 of the motor frame 53. Screws 54 connect the spring member 40 to the bracket 45 by extending through the apertured ears 42 and body 46.

A speed adjusting lever 55 has spaced apart apertured arms 56 pivotally connected at 57 to the rearwardly projecting apertured bosses 47 of the brackets 45. Extending upwardly and laterally from the speed adjusting lever 55 is an arm 58 through which extends an adjusting screw 59. When the adjusting lever 55 is mounted on the bracket 45, as shown in FIG. 1, an electrical contact 60 on the forward face of the lever 55 engages the contact 61 on the rearward face of the spring member 40.

The adjusting screw 59 engages the manually actuated speed control dial 65 which has a hub 66 rotatable on the shaft 67 mounted on any suitable support such as indicated at 68. The rearward face of the dial 65 has cam surfaces 69 for contact by the adjusting screw 59. The selected speed position of the dial 65 determines the position of the lever 55, through engagement between the screw 59 and cam surfaces 69, and thus influences the make and break tendency of the contacts 60, 61.

The modified embodiment of the invention shown in FIGS. 4 and 5 illustrates the operation of our centrifugal governor in combination with a different form of contact carrying spring members and speed adjustment lever. It also illustrates the use of the governor when located in the rear of a power unit. Other differences between the constructions shown in FIGS. 1-3, inclusive and in FIGS. 4 and 5 will be pointed out in the following description.

As shown in FIG. 4, the motor shaft 70 is mounted in a bearing supported on a part 71 of the motor frame in the housing 72, the free rearward end 73 of the shaft being reduced in diameter. The resilient plate 75 of the centrifugal governor is similar to the plate 21 heretofore described, and the two blades 76 are exactly like the blades 26 except that they have not been provided with slots such as those indicated at 29 in the blades 26. The means for connecting the blades 76 to the resilient plate 75 include rivets 77 and backing plates 78 similar to parts heretofore described. The resilient plate 75 is mounted on the reduced end 79 of the hub 80 on which the fan 81 also is mounted, but the fan may be mounted directly on the shaft 70.

The nylon slider differs from the slider 35 in several respects. It does not have arms 37 with projections 38. The slider 82 has an annular surface 83 against which bear the free curved edges of the blades 76. The end surface 84 of the slider contacts the contact carrying spring member 85.

The switch mechanism shown in FIG. 4, including the contact carrying spring members 85, 86, with contacts 87, 88, thereon is not a novel feature of this invention, but has been illustrated to show that the speed responsive units embodying our invention, as shown in FIGS. 1 and 4, may be used with different types of switch mechanisms. A lever 90, attached to this spring member 86, has an adjusting screw 91 threaded into its upper end to bear against a rod 92 actuated by manually operated cam surfaced control dial (not shown).

When the governor parts are in the position shown in FIG. 1, the blades 26 are spaced from the resilient plate 21 a relatively short distance in the areas nearest the shaft 12 due to their slightly bowed form, and the curved edges 28 of the two blades are concentric with and relatively close to the shaft 12. As the motor speed increases, the centrifugally influenced resilient plate 21 bends rearwardly in its opposite outer end portions, and the blades 26 move with the plate at their outer connected ends where they have face to face contact with the plate 21. However, since the blades 26 are free at their inner ends, they move away from each other and also away from the central portion of the resilient plate 21. This movement of the blades 26 is the same as that illustrated in FIG. 5 in connection with the blades 76 relatively to the plate 75 excepting that the blades 26 move forwardly from the position shown in FIG. 1 while the blades 76 move rearwardly from the position shown in FIG. 4.

In the construction of FIG. 1, the effect of the described movement of the blades 26 is to move the slider 35 toward the spring member 40, causing the contact 61 to break electrical contact with the contact 60 on lever 55. The effect of the described movement in the structure of FIG. 4 is to move the slider 82 toward the spring member 85, causing the contact 87 to break electrical contact with the contact 88 on the lever controlled member 86. When speed decreases due to such momentary breaks in electrical contact, the speed responsive parts resume their normal positions and the switch contacts again establish electrical circuits.

Changes may be made in details of construction and in the form and arrangement of parts without departing from the scope of the invention as defined by the appended claims.

We claim:

1. In a power unit including an electric motor having a shaft, a centrifugal governor comprising a flat elongated resilient plate having a central opening, a hub fixed on the shaft to rotate therewith, the plate being fixed on the hub to extend radially equally in opposite directions, a pair of identical blades made of soft formable metal extending longitudinally of the plate, means firmly connecting each blade near its outer end to an outer end of the resilient plate in face to face contact with the plate at said end portion, the rest of each blade being free and extending in oppositely inclined planes toward the shaft and terminating in an inner end edge slightly spaced from the shaft, a slider element mounted on the shaft and having one end in contact with the inner ends of the blades, the plate being influenced by centrifugal force to bend near its outer ends and to move the free ends of the blades away from each other and from the plate and toward the slider element said movement of the blades transmitting sliding movement to the slider longitudinally of the shaft by bearing contact of said free ends of the blades against the slider, and switch mechanism including a spring member mounted in the power unit in yielding contact with the other end of the slider.

2. The centrifugal governor defined by claim 1, in which the means firmly connecting each blade to the resilient plate comprises a backing plate contacting the resilient plate at one side, and rivets extending through the blade, resilient plate and backing plate and clinched on the exposed side of the backing plate.

3. The centrifugal governor defined by claim 1, in which the inner end edge of each blade is concentric with the motor shaft.

4. The centrifugal governor defined by claim 1, in which the blades are slotted between their ends, and the slider element includes two radially extending opposite arms having projections which are free at their outer ends and enter the slots of the blades.

5. In a power unit including an electric motor having a shaft, a centrifugal governor comprising a flat elongated resilient plate having a central opening, a hub fixed on the shaft to rotate therewith, the plate being fixed on the hub to extend radially equally in opposite directions, a pair of identical blades made of soft formable metal extending longitudinally of the plate, means firmly connecting each blade near its outer end to an outer end of the resilient plate in face to face contact with the plate at said end portion, the rest of each blade being free and extending in oppositely inclined planes toward the shaft and terminating in an inner end edge slightly spaced from the shaft, a slider element mounted on the shaft and having one end in contact with the inner ends of the blades, the plate being influenced by centrifugal force to bend near its outer ends and to move the free ends of the blades away from each other and from the plate and toward the slider element said movement of the blades transmitting sliding movement to the slider longitudinally of the shaft by bearing contact of said free ends of the blades against the slider, and switch mechanism comprising a bracket stationarily mounted in the power unit, a spring member attached at one of its ends to said bracket and having spaced apart legs at its other end straddling the motor shaft in yielding contact with the slider, a lever pivotally connected to the bracket, and electrical contacts on the proximate faces of the spring member and pivoted lever.

6. The centrifugal governor defined by claim 5, in which the spring member of the switch mechanism includes a flexible body extending upwardly from the bracket and downwardly to the spaced apart legs, the upwardly and the downwardly extending portions of the flexible body being integral with a curved portion between them, and the contact on the spring member being located on said downwardly extending portion of the flexible body.

7. In a power unit including an electric motor having a shaft, a centrifugal governor comprising a flat elongated resilient plate having a central opening, a hub mounted on the shaft to rotate therewith, the plate being fixed on the hub to extend radially equally in opposite directions, a pair of identical blades made of soft formable metal extending longitudinally of the plate, means firmly connected each blade near its outer end to an outer end of the resilient plate in face to face contact with the plate at said end portion, the rest of each blade being free, each blade extending toward the shaft and terminating in an inner end edge slightly spaced from the shaft, a slider element mounted on the shaft and having one end in contact with the inner ends of the blades, the plate being influenced by centrifugal force to bend near its outer ends and to move the free ends of the blades away from each other and from the plate, said movement of the blades transmitting sliding movement to the slider longitudinally of the shaft, and switch mechanism comprising a bracket stationarily mounted in the power unit, a spring member attached at one end to the bracket and having its other end in yielding contact with the slider, a lever pivotally connected to the bracket, electrical contacts on the proximate faces of the spring member and pivoted lever, a cam faced control dial, and adjustment means between the pivoted lever and the dial.

8. In a power unit including an electric motor having a shaft, a centrifugal governor mounted on the shaft including a slider element movable longitudinally of the shaft, a control dial, and switch mechanism mounted in the power unit between the centrifugal governor and the control dial, said switch mechanism including a spring member having an elongated flexible metal body fixedly mounted at one end on a support, said body extending upwardly from the support and then downwardly and being integral with a curved portion between the upwardly and downwardly extending body portions, the downwardly extending body portion terminating in a free end yieldingly contacting the slider element.

9. The mechanism defined by claim 8, in which the free end of the spring member flexible body terminates in spaced apart legs which straddle the motor shaft in yielding contact with the slider element.

References Cited in the file of this patent

UNITED STATES PATENTS

| | | |
|---|---|---|
| 2,662,143 | Eckles | Dec. 8, 1953 |
| 2,903,535 | Sparklin | Sept. 8, 1959 |
| 2,923,789 | Howard | Feb. 2, 1960 |